June 15, 1937.  A. KAROLUS  2,084,201
LIGHT RELAY
Filed July 5, 1933
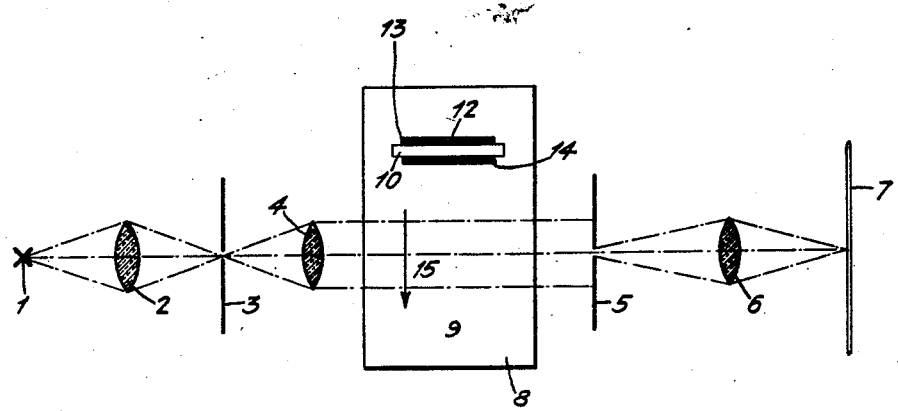
INVENTOR
AUGUST KAROLUS
BY H. S. Grover
ATTORNEY Patented June 15, 1937

2,084,201

UNITED STATES PATENT OFFICE 2,084,201

LIGHT RELAY

August Karolus, Leipzig, Germany

Application July 5, 1933, Serial No. 679,089. In Germany July 13, 1932

6 Claims. (Cl. 88—61)

This invention relates to a light relay or valve and finds particular application in connection with the recording of sound signals upon a film, in the reproduction of television images as well as in picture reproduction and allied arts.

When a sound wave propagates or progresses within a compressible medium, there occur periodic compressions and rarefactions. The interval or distance between two points of like motional state, measured in the direction of propagation is known as the wave-length, its size is a function of the acoustic frequency and the velocity of the sound peculiar to the medium in question. In transparent substances, also, the optical properties and particularly the refractive index or the perviousness change with the density.

If sound propagates with an even wave-front, the medium in the case of high acoustic frequencies, i. e., small wave-lengths, assumes the property of a diffraction grating by virtue of and because of the inherent lack of homogeneousness. Imaging a slit-shaped source of light through a system of lenses upon a screen, and if then a diffraction grating be interposed in the path of the rays, there result laterally displaced diffraction patterns, that is the spectra, and these under certain circumstances may overlap. The positions of these patterns or images is conditioned by the lattice or grating constant, i. e., the distance between surfaces of equal density, that is, the isodense surfaces, whereas the proportion or share in the aggregate luminous volume corresponding to the various diffraction pictures is governed by the ratio between the permeability of the lines constituting the screen or grating and the gaps or interstices. Hence, owing to the arising of the diffraction pictures part of the aggregate luminosity will be shifted there so that the central picture of the light source will seem darker.

In the light of these observations, the present invention discloses a novel light relay or valve which will be useful, for instance, for the purposes of photo-telephony, sound recording, picture-telegraphy, and television work.

The basic idea of the invention shall be explained in more detail by reference to the attached drawing which shows a sectional schematic plan view of one suitable arrangement. Referring to the drawing, numeral 1 denotes the light source which is imaged by a lens 2 upon a slit diaphragm 3. Instead of the slit 3 there could be used also a slit-shaped source of light such as a filament lamp, a glow tube of capillary form or the like. The next lens 4 images the illuminated slit 3 with parallel rays in the plane of a further slit diaphragm 5. By the lens 6 the light which passes through the slit 5 is collected upon the light responsive layer 7 or upon any suitable screen.

In order that, in the case of sound recording, also high frequencies may be representable, it will be recommendable to make lens 6 of the cylinder type and to thus contract or condense the image thrown by slit 5 upon the image plane 7 to result in a narrow line. Interposed in the path of the parallel rays is a vessel 8 having transparent walls and which is filled with a transparent optically active fluid 9.

Confined inside the vessel 8 is moreover a sound source consisting of a plate 10 made from piezoelectric material, such as quartz, which by means of two electrodes 11 and 12 is caused to experience mechanical vibrations. The electrodes 11 and 12 are united by the leads 13 and 14 with a source of alternating current of suitable frequency. These mechanical vibrations propagate in the direction indicated by the arrow in the form of planer-fronted waves progressing parallel to the path of the pencil of light-rays across the liquid 9. Choosing, e. g., a frequency of $3 \times 10^6$ C. P. S. and a liquid possessing or allowing of a velocity of sound of 1000 meters per second, it will be seen that the wave length amounts to $\frac{1}{3}$ mm. The distance between layers of maximum density will be of the same size, i. e., the screen or grating constant. By virtue of the diffractive effect of the liquid grating, there are produced in the plane through the slit 5 several diffraction pictures of slit 3 which, under certain circumstances, may partly overlap so that the luminous lines appear merely widened. Of course, the entire luminosity is spread over a larger area so that less light will correspond to the slit diaphragm 5 which is made of like size as, or slightly smaller than, the unexpanded picture or image of slit 3. As a result also the volume of light focused upon the light responsive layer 7 will be smaller so that the spatial distribution of the light is converted into a change of intensity.

The grating constant of the liquid grating and thus the shift in the diffraction spectra or patterns in the plane laid through the plane of the slit diaphragm 5 depends upon the frequency of the sound wave. Diffractive action, as is well known, is so much stronger, the finer or closer the grating. Hence, as high as possible an acoustic frequency should be chosen. But the distribution of the light over those diffraction patterns is a function of the density differences in the diffraction grating. These will become so much more marked, the higher the sound amplitude. Hence, there exists a quantitative relationship between the sound amplitude and the volume of light impinging upon the light responsive layer 7; and this relationship may, at will, be rendered linear or else be made to answer some other law or function in view of the gradation of the light responsive emulsion by that the amplitude control of the sound source or exciter is effected in a corresponding manner.

So far as the selection of liquid 9 is concerned, the following viewpoints are governing: The liquid must be transparent and absorb a minimum of light. The velocity of the sound in the liquid should be as low as possible in order that also the wave length may be small, for a given acoustic frequency. The viscosity of the liquid should not be unduly high, for this would obstruct good grating properties. If the sound exciter is immersed inside the liquid, the latter should also possess sufficient breakdown strength. Among the liquids which will be found to answer these requirements, for instance, are carbon tetrachloride ($CCl_4$), carbon disulphide ($CS_2$), and nitrobenzol ($C_6H_5NO_2$), as well as others, although carbon tetrachloride is preferable.

The sound exciter or source is above supposed to consist of a quartz crystal though it will be understood that also some other piezo-electric material such as tourmaline could be employed instead, most preferably in the form of a plate or lamina which is excited by transverse (thickness) vibrations, with the maximum extension of the lamina being parallel to the path of the light. Inasmuch as the brightness control is so much more effective, the longer the path of the light across the medium, this means a comparatively large size of crystal, and this, in turn, makes for an undesirably high capacity in the arrangement. In order to compensate the same another object of the invention is to use either a plurality of crystals excited under iso-phasic conditions or at least to subdivide the electrodes and to connect them with different power stages working in phase. It is not directly necessary that the sound source should be immersed directly in the liquid itself, in fact, it will suffice for the acoustic source to excite the walls of vessel 8 whence the acoustic vibrations will be imparted to the liquid 9.

The modulation of the sound transmitter with the impulses to be recorded is accomplished, e. g., in such a way that the electric generator feeding the sound source, such as thermionic or similar transmitter, is subjected to amplitude modulations. In order that a large range of frequencies may be uniformly reproduced, as necessary, for example, in television transmitter work, the system should have sufficient damping, and this damping may be obtained either by electric ways and means by suitable proportioning of the control circuit for the sound transmitter or else by the choice of a liquid, optionally a mixture of several liquids involving suitable internal friction. In order that thorough modulation of the volume of light issuing from the light source 1 may be insured, it is necessary that the diaphragms 3 and 5 should be of the slit type. In order that larger quantities of light may be handled, this further suggestion is made to use a plurality of slits 3 which are imaged or thrown upon an equally great number of slits 5. The lateral distance, for a given grating constant, should then be so chosen that the enlarged diffraction patterns will not overlap the slits 5 and thus result in an an approximately equal brightness. The light passing through the various slits 5 by the aid of a condensing lens means may be contracted or focused to result in a line upon the projection surface so that the control actions of all slits are added or integrated.

Inasmuch as the resolving power of a crossed grating, as is well known, is greater than that of a mere line (ruled) grating or screen the arrangement before indicated is expanded in that two liquid gratings are provided the planes of whose layers are crossed at an angle of 90 degrees. This may be effected either by that inside one vessel there are accommodated two sound sources positioned at right angles to each other which are controlled by one and the same electric generator or else by that two distinct vessels in which the wave planes of the sound excitation are staggered 90 degrees in reference to each other, are disposed sequentially (in series). Another conceivable plan would be to combine an invariable diffraction grating, say, in the form of a ruled glass plate with a liquid grating such as hereinbefore disclosed in order to thus promote the dispersive action.

Since such a diffraction grating occasions also color dispersion (chromatism) which may be undesirable, for instance, because of the spectral sensitiveness of photographic coats, the use of monochromatic light is suggested in such cases.

Having now described the invention, what is claimed and desired to secure by Letters Patent is the following:

1. The method of recording modulation frequencies which comprises developing a source of modulation frequencies, directing monochromatic light through a liquid whose index of refraction changes under pressure, producing within the liquid, under the control of the modulation frequencies to be recorded, standing waves of varying amplitude perpendicular to the direction of the monochromatic light to cause in the liquid different diffraction grating effects, and recording the light issuing from the liquid.

2. The method of obtaining observable variations in light in accordance with predetermined electrical modulation frequencies which comprises developing a source of modulation frequencies, directing a constant intensity line of light through an optically active liquid whose index of refraction changes under pressure, producing within the liquid under the control of the electrical modulating frequencies standing waves perpendicular to the direction of the light waves to produce differing diffraction grating effects, and controlling the issuing light intensity in accordance with the spatial distribution of the said grating effects.

3. The method of modulating light in accordance with electrical modulation which comprises developing a source of modulation frequencies of varying amplitude, directing a beam of constant intensity light through an optically responsive liquid whose index of refraction changes under pressure, producing within the liquid under the control of the electrical modulation varying diffraction grating effects and limiting the amount of light issuing through the liquid in accordance with the spatial distribution of the grating effects.

4. A light control device comprising a container having transparent walls, an optically responsive liquid whose index of refraction changes under pressure within the container, means for producing a beam of light and directing the same through the said liquid, means to impress modulation signals upon the system, a vibratory means within the liquid for causing when signals are applied to the vibratory means different diffraction grating effects within the liquid proportional to the amplitude of the impressed signals, and means for receiving the modulated light issuing from the liquid.

5. In apparatus of the class described, the combination of a source of light, means for directing a beam of light from the source, means for receiving the beam, an optically responsive liquid whose index of refraction changes under pressure interposed between the said source and the said receiving means, means to impress modulation signals upon the liquid, and means for applying stress to said liquid in accordance with predetermined electrical oscillations having a frequency corresponding to a wave length of sound in said liquid less than the cross-section of said liquid traversed by the said light beam.

6. In apparatus of the class described wherein light from a source is adapted to pass through to a receiving means, an optically responsive liquid whose index of refraction changes under pressure interposed between the source and the receiving means, means to impress modulation signals upon the liquid, and means for applying hydrostatic stresses to the liquid in accordance with the applied modulation frequencies to produce within the liquid stresses causing diffraction grating effects of the light, said grating effects varying with the applied frequencies.

AUGUST KAROLUS.